United States Patent
Takasaki et al.

(10) Patent No.: US 8,396,422 B2
(45) Date of Patent: Mar. 12, 2013

(54) COMMUNICATION CONTROL DEVICE, METHOD OF DETERMINING COMMUNICATION CONTROL DEVICE, AND STORAGE MEDIUM FOR PERFORMING THE METHOD

(75) Inventors: Atsushi Takasaki, Kawasaki (JP); Tetsuo Kanda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1007 days.

(21) Appl. No.: 11/550,323

(22) Filed: Oct. 17, 2006

(65) Prior Publication Data

US 2007/0100983 A1    May 3, 2007

(30) Foreign Application Priority Data

Oct. 31, 2005   (JP) .................................. 2005-317113

(51) Int. Cl.
*H04B 7/00*   (2006.01)
(52) U.S. Cl. ....... 455/41.2; 709/223; 709/226; 370/350; 370/331
(58) Field of Classification Search ................. 455/41.2; 709/223
See application file for complete search history.

(56) References Cited

U.S. PATENT DOCUMENTS

| 6,879,810 | B2 * | 4/2005 | Bouet ........................... 455/41.2 |
| 7,016,707 | B2 * | 3/2006 | Fujisawa et al. .............. 455/567 |
| 2002/0055978 | A1 * | 5/2002 | Joon-Bo et al. ................ 709/209 |
| 2003/0137970 | A1 * | 7/2003 | Odman ......................... 370/350 |
| 2003/0190916 | A1 * | 10/2003 | Celedon et al. ............... 455/437 |
| 2004/0218683 | A1 * | 11/2004 | Batra et al. .................... 375/261 |
| 2004/0228311 | A1 * | 11/2004 | Sugaya et al. ................. 370/338 |
| 2005/0059420 | A1 * | 3/2005 | Salokannel et al. .......... 455/522 |
| 2005/0068930 | A1 * | 3/2005 | Choi et al. ..................... 370/343 |
| 2005/0075084 | A1 * | 4/2005 | Salokannel et al. .......... 455/126 |
| 2005/0089058 | A1 * | 4/2005 | Hong et al. .................... 370/445 |
| 2005/0094657 | A1 * | 5/2005 | Sung et al. ..................... 370/431 |

(Continued)

FOREIGN PATENT DOCUMENTS

| JP | 2002-223217 A | 8/2002 |
| JP | 2003-273883 A | 9/2003 |

(Continued)

OTHER PUBLICATIONS

H. Jeong, M. Cho, S. Kim, D. Kim, and J. Lee; "PNC Candidate Inquiry Method for PNC Handover on WPAN," Personal, Inidoor and Mobile Radio Communications, 2004. PIMRC 2004. 15$^{th}$ IEEE International Symposium on Barelona Spain Sep. 5-8, 2004, Pistacataway, NJ, USA, IEEE, vol. 3 pp. 1752-1765.*

(Continued)

*Primary Examiner* — Nay A Maung
*Assistant Examiner* — Erica Fleming-Hall
(74) *Attorney, Agent, or Firm* — Canon USA Inc. IP Division

(57) ABSTRACT

A device and method for controlling communication among a plurality of communication devices, the device and method including causing each of one or more candidate devices to which control rights of a network are transferable, from among the plurality of communication devices, to transmit a pseudo information signal, counting, for each of the one or more candidate devices, the number of communication devices from the plurality of communication devices having responded to the pseudo information signal, and determining a candidate device to which to transfer control rights of the network based on the number of communication devices from the plurality of communication devices having responded to the pseudo information signal.

18 Claims, 9 Drawing Sheets

U.S. PATENT DOCUMENTS

| | | | |
|---|---|---|---|
| 2005/0124293 A1* | 6/2005 | Alicherry et al. | 455/41.2 |
| 2005/0201310 A1* | 9/2005 | Fujioka | 370/310 |
| 2005/0221752 A1* | 10/2005 | Jamieson et al. | 455/1 |
| 2005/0237958 A1* | 10/2005 | Sung et al. | 370/310 |
| 2005/0237979 A1* | 10/2005 | Kim et al. | 370/331 |
| 2006/0050709 A1* | 3/2006 | Sung et al. | 370/394 |
| 2006/0067280 A1* | 3/2006 | Howard et al. | 370/337 |
| 2007/0086449 A1* | 4/2007 | Huang et al. | 370/389 |
| 2008/0137577 A1* | 6/2008 | Habetha | 370/311 |
| 2009/0161622 A1* | 6/2009 | Sugaya | 370/329 |

FOREIGN PATENT DOCUMENTS

| | | |
|---|---|---|
| JP | 2004-254048 A | 9/2004 |
| JP | 2005-027280 A | 1/2005 |
| JP | 2005-275539 A | 10/2005 |

OTHER PUBLICATIONS

IEEE Std. 802.15.3-2003, IEEE, 2003, (Section 1, 5, and 8.2.3).

* cited by examiner

COMMUNICATION CONTROL DEVICE, METHOD OF DETERMINING COMMUNICATION CONTROL DEVICE, AND STORAGE MEDIUM FOR PERFORMING THE METHOD

BACKGROUND OF THE INVENTION

1. Field of the Invention

The present invention relates to techniques of transferring control rights of communication among a plurality of communication devices.

2. Description of the Related Art

IEEE802.15.3 (see IEEE Std. 802.15.3-2003, IEEE, 2003) is a Medium Access Control (MAC) standard for Wireless Personal Area Networks (WPANs). This standard is specialized for WPANs and has an advantage in enabling simplification of the configuration of network devices, as compared with local area network (LAN) standards.

According to a wireless communication system conforming to the IEEE802.15.3 standard, in each piconet including one or more devices, one device serving as a control device is present and controls traffic in the piconet. However, because it is assumed that devices relatively frequently join and leave the piconet, the control device is not fixedly provided therein. A control rights transfer process of transferring control rights to a piconet device differing from the current control device is performed, for example, in a case where a piconet device, which is superior in functions and performance, such as the number of controllable devices, to a current control device, newly joins the piconet, or where the current control device leaves the piconet for some reason. The piconet can continuously be maintained by performing the control rights transfer process. The control rights transfer process is described in detail in Section 8.2.3 "PNC Handover" in IEEE Std. 802.15.3-2003, IEEE, 2003.

However, when performing the process of transferring control rights to a device, which is determined according to the function and the level of performance, as described above, in many instances the wireless communication system has encountered a problem that a piconet device may be unable to continue to join the piconet.

FIG. 1 illustrates a positional relationship among a piconet coordinator (PNC) 101, which is a piconet device enabled to serve as a control device, and other piconet devices (DEVs) 111 to 114, which do not serve as a control device, in a piconet. The PNC 101 controls/manages the DEVs 111 to 114 in the piconet.

In FIG. 1, a closed curve 150 represents a range in which the DEVs 111 to 114 can be located so that the PNC 101 can communicate with each of the DEVs 111 to 114. That is, in the range 150, each of the DEVs 111 to 114 can communicate directly with the PNC 101. However, it is not sure whether each of the DEVs 111 to 114 can communicate directly with any one of the other DEVs 111 to 114. For example, it is assumed that the DEVs 112 and 113 shown in FIG. 1 cannot communicate directly with each other because of signal attenuation due to the distance between them.

In a case where the PNC 101 is changed, by changing an operation mode, to a DEV, which is unable to control the other DEVs, it is necessary to transfer control rights (herein after referred to as "PNC handover") to one of the DEVs 111 to 114. For example, it is assumed that the possibilities of communication between the devices provided in the piconet are classified according to levels as a security countermeasure. Because the PNC can communicate with all of the other devices in the piconet which the PNC joins, the PNC handover is needed in a case where it is necessary to reduce a security level of the PNC (e.g., a case where a person other than an owner of the PNC temporarily uses the PNC). Also, in a case where the PNC finishes an operation and leaves the piconet, the PNC handover is needed. At that time, first, a DEV (hereinafter referred to as a PNC candidate) to be operated as a PNC, is selected as a DEV to which control is transferred. In a case where a plurality of PNC candidates is present, a DEV having the highest level function and performance is selected.

In a case where the DEVs 113 and 114 are PNC candidates and the DEV 113 is higher in function and performance than the DEV 114, the PNC 101 selects the DEV 113 as a DEV to which control rights are transferred. Subsequently, the PNC handover is performed. Thus, the DEV 113 and the PNC 101 change operation modes, so that the DEV 113 is changed to a PNC and the PNC 101 is changed to a DEV.

FIG. 2 illustrates a positional relationship among a PNC and DEVs after the PNC handover is performed. The PNC 201 and the DEV 215 correspond to the DEV 113 and the PNC 101 shown in FIG. 1, respectively. A closed curve 250 represents a communicatable range in which the DEVs can be located so that the PNC 201 can communicate with each of the DEVs. That is, the DEV 112 is out of the communicatable range of the PNC 201. Therefore, the DEV 112 is forcibly disconnected from the piconet, and cannot continue to join the piconet.

SUMMARY OF THE INVENTION

One feature of the present invention is to reduce, when a control rights transfer process is performed in a network, the number of network devices that cannot continue to join the network.

Another feature of the present invention is to efficiently determine a network device to which control rights is transferred.

According to an aspect of the present invention, a communication control device configured to control communication among a plurality of communication devices includes a counting unit configured to cause each of one or more candidate devices to which control rights of a network are transferable, from among the plurality of communication devices, to transmit a pseudo information signal, and to count, for each of the candidate devices, the number of communication devices from the plurality of communication devices having responded to the pseudo information signal, and a determination unit configured to determine a candidate device to which to transfer control rights of the network based on the number of communication devices from the plurality of communication devices having responded to the pseudo information signal.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

In the following description, a control device is referred to as a PNC (piconet coordinator). Devices, which do not serve as a control device, are referred to DEVs. A network including the PNC and the DEVs is referred to as a piconet.

First Exemplary Embodiment

Outline. In the first exemplary embodiment, a PNC causes each PNC candidate (DEV) to transmit a pseudo information signal (hereinafter referred to as a dummy beacon). The PNC detects responses to the dummy beacon from the other DEVs in the piconet. Thus, the PNC can determine a communicatable state of the PNC candidate having transmitted the dummy beacon. The PNC determines which PNC candidate to transfer control rights to according to the communicatable states of the PNC candidates. Consequently, the PNC can reduce the number of the DEVs that cannot continue to join the piconet.

Configuration of Entire Communication System

Figure 1:
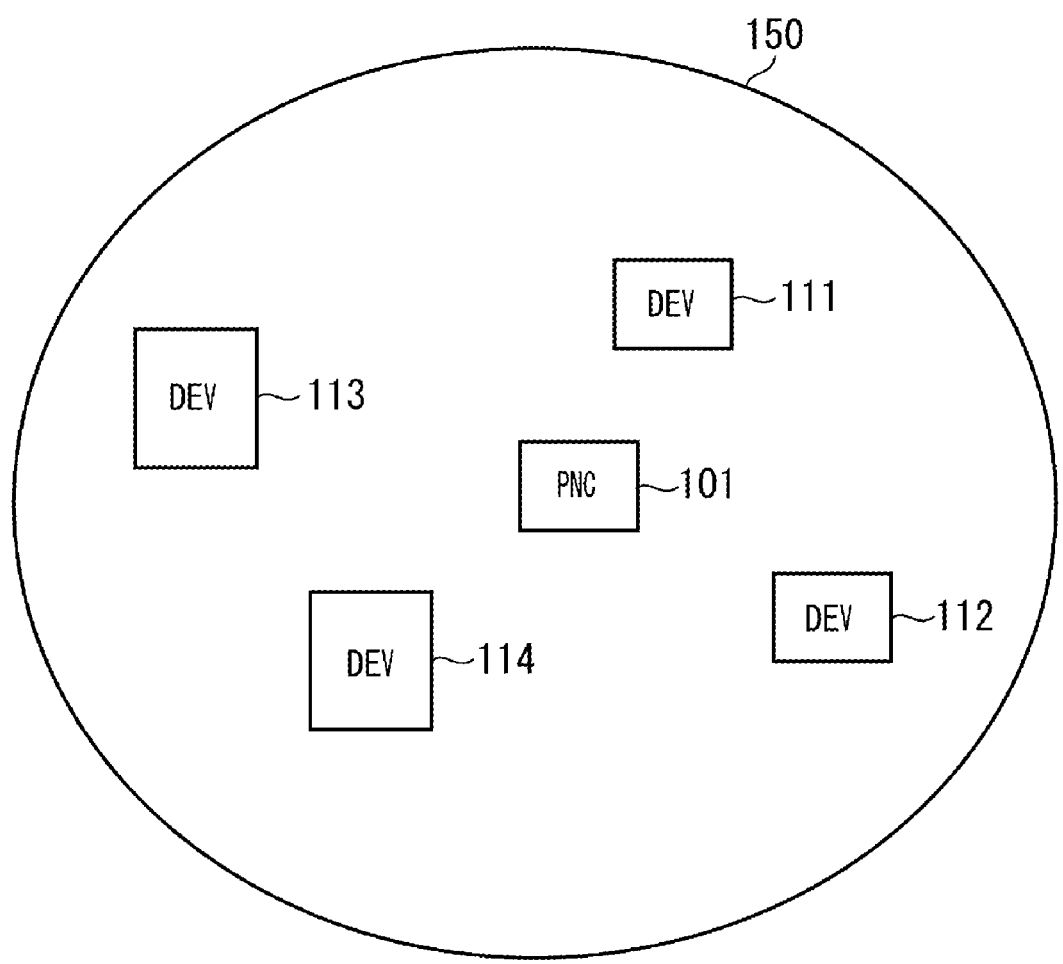
FIG. 1 illustrates an exemplary positional relationship among a control device and slave devices in a piconet.
Figure 2:
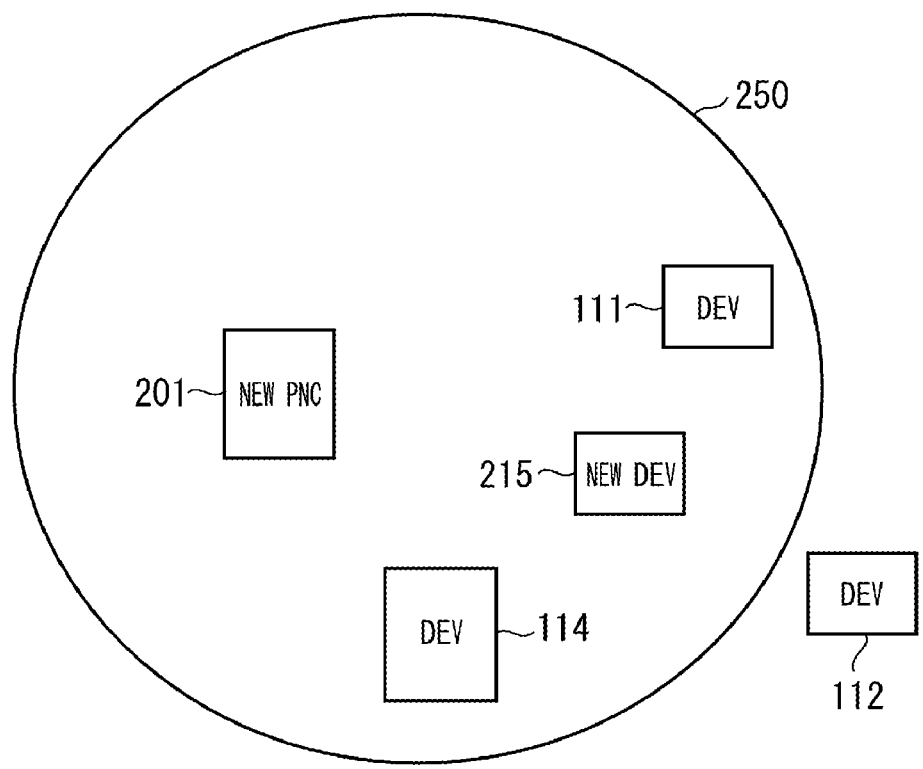
FIG. 2 illustrates an exemplary positional relationship among a control device and slave devices after control rights is transferred.

The configuration of the entire communication system is described below by assuming that the communication system conforms to the IEEE802.15.3 standard, and that the positional relationship among the PNC and the DEVs is similar to the positional relationship illustrated in FIG. 1. That is, the PNC 101 manages the DEVs 111 to 114 as devices joining the piconet. The DEVs 112 and 113 cannot communicate directly with each other because of signal attenuation due to the distance between them. The DEVs 113 and 114 are PNC candidates.

Internal Configuration of Device

Figure 3:
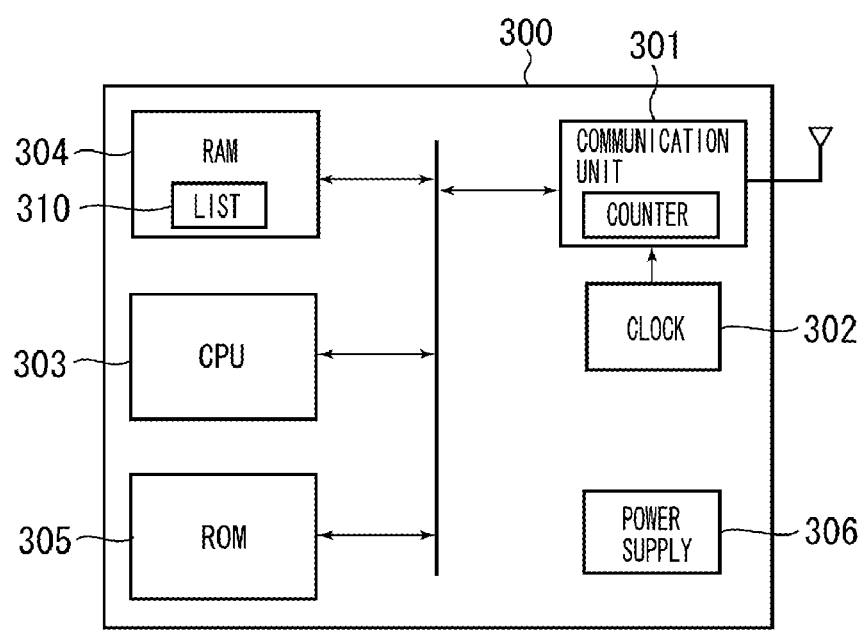
FIG. 3 is a block diagram illustrating an internal configuration of a communication device.

FIG. 3 is a block diagram illustrating the internal configuration of a piconet device according to the first exemplary embodiment. The internal configuration shown in this block diagram is common to the PNC and the DEVs. The PNC and each of the DEVs differ from each other in operation mode due to whether the device is a control device in the piconet.

A communication unit 301 provides a communication function. A clock generation unit 302 generates a clock that is a timing reference of the communication unit 301. A central processing unit (CPU) 303 executes a control program and controls an operation of the device. A random-access memory (RAM) 304 is utilized as both a memory area, which is used to execute the control program, and a temporary storage area configured to store operation parameters, such as a PNID which will be described later. In a case where the device is the PNC, information (hereinafter referred to as a DEV list 310) on the devices joining the piconet, which is managed by the PNC, is temporarily stored in the RAM 304. A read-only memory (ROM) 305 stores various control programs executed by the CPU 303 and also stores parameters such as identification addresses that will be described later. A power supply unit 306 is used to operate each component of the device.

Frame Structure

Figure 4:
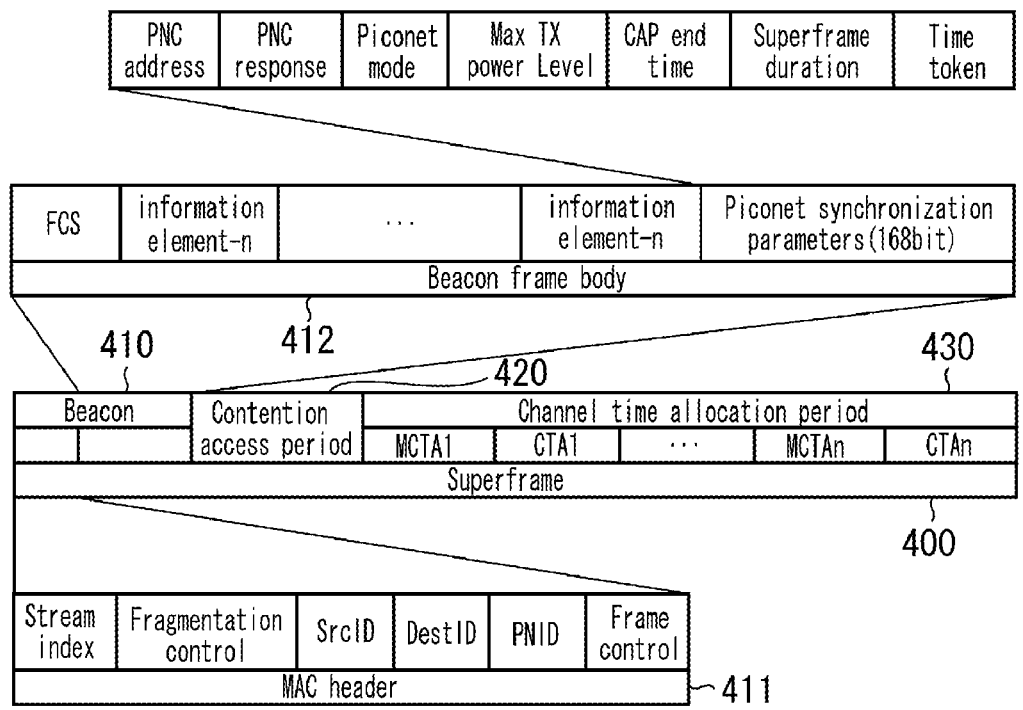
FIG. 4 illustrates a structure of an IEEE802.15.3 communication frame (superframe).

FIG. 4 illustrates a structure of a communication frame (superframe) conforming to the IEEE802.15.3 standard.

A superframe 400 includes a beacon frame (BF) 410 used to control the piconet, and periods used to perform actual data communications between devices. The periods used to perform actual data communications include a contention access period (CAP) 420 and a channel time allocation period (CTAP) 430. The CTAP 430 includes a plurality of periods (hereinafter referred to as slots) assigned to each communication device.

The BF 410 is placed at a leading portion of the superframe 400 and is periodically transmitted by the PNC. The BF 410 includes basic information used to manage the piconet. The DEV can know timing of a slot, which is used by the DEV at transmission or reception, and a change in various setting information by receiving the BF 410. Each DEV in the piconet acquires the periodically transmitted BF 410. This prevents an occurrence of an out-of-synchronization condition between the DEVs.

A slot is allotted to each DEV in response to a request from a DEV in the piconet or according to the determination by the PNC. Each DEV performs communication in a time-sharing manner according to slot information notified by using the BF 410. Communication between the devices in the piconet is performed in this way to prevent an occurrence of communication collision.

As illustrated in FIG. 4, the BF 410 includes a MAC header (MH) 411 and a beacon frame body (BFB) 412. In the MH 411, an identification address of a signal source device is stored as SrcID. Also, an identification address of a signal destination device is stored therein as DestID. Also, an identification ID of the piconet is stored therein as PNID. The BFB 412 has a region called piconet synchronization parameters in which an identification address of the PNC is stored as the PNC address.

Detection of Adjacent Piconet

In a case where a plurality of piconets are present and adjoining one another, the DEV receives a plurality of beacon signals.

Figure 5:
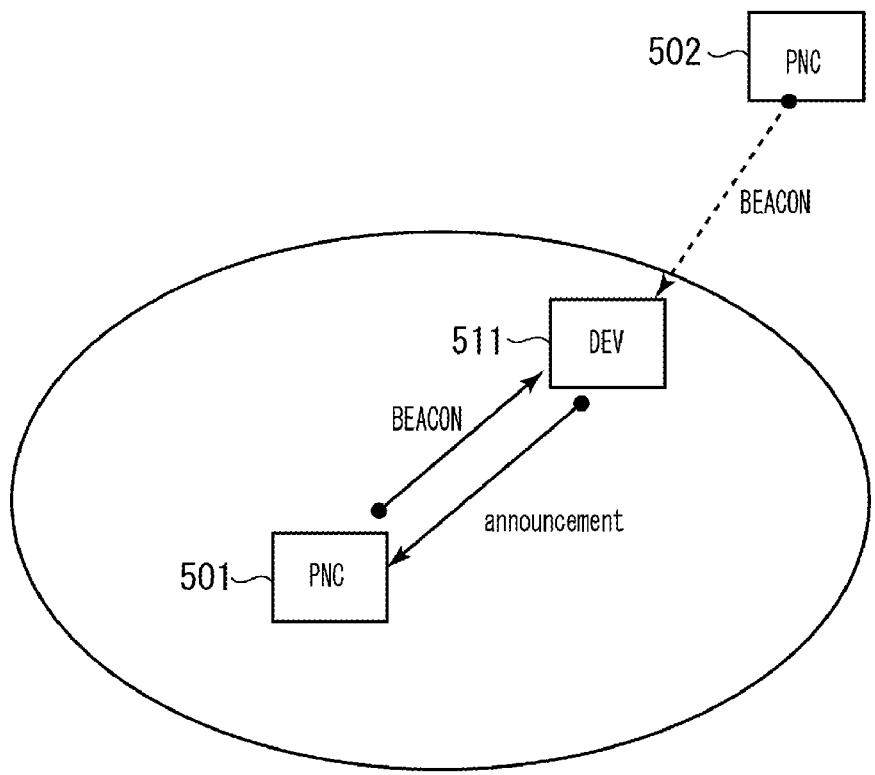
FIG. 5 illustrates a DEV that receives a beacon from a PNC of an adjacent piconet.

FIG. 5 illustrates a DEV that receives a beacon from a PNC of an adjacent piconet. A DEV 511 joins a piconet controlled by a PNC 501 and receives a beacon from the PNC 501. The DEV 511 also receives a beacon from a PNC 502 of the adjacent piconet.

Typically, adjacent piconets can be distinguished from each other by using the PNIDs stored in the MH 411. However, the PNID is a value that can be optionally set. Thus, adjacent piconets may use the same PNID. Although the adjacent piconets can be distinguished from each other by using the PNC address stored in the BFB 412, normal piconet control is performed according to the PNID.

In view of such circumstances, per the IEEE802.15.3 standard, when a DEV receives a beacon having the same PNID as the PNID of a piconet, in which the DEV takes part, and a PNC address differing from the PNC address of the piconet, the DEV reports the reception of the beacon to the PNC of the piconet in which the DEV takes part. More specifically, when a DEV 511 receives a beacon having the same PNID as that of a PNC 501 from a PNC 502, the DEV 511 transmits an announcement signal to the PNC 501. That is, the DEV 511 transmits the announcement signal to the PNC 501 by using the received beacon, which has a PNC address different from the PNC address of the PNC 501, as a trigger.

Determination of Communicatable State of PNC Candidate Utilizing Announcement Signal The PNC can determine a communicatable state, in which the PNC candidate is communicatable with each of other DEVs, in the following procedure utilizing the function of an announcement signal.

Figure 6:
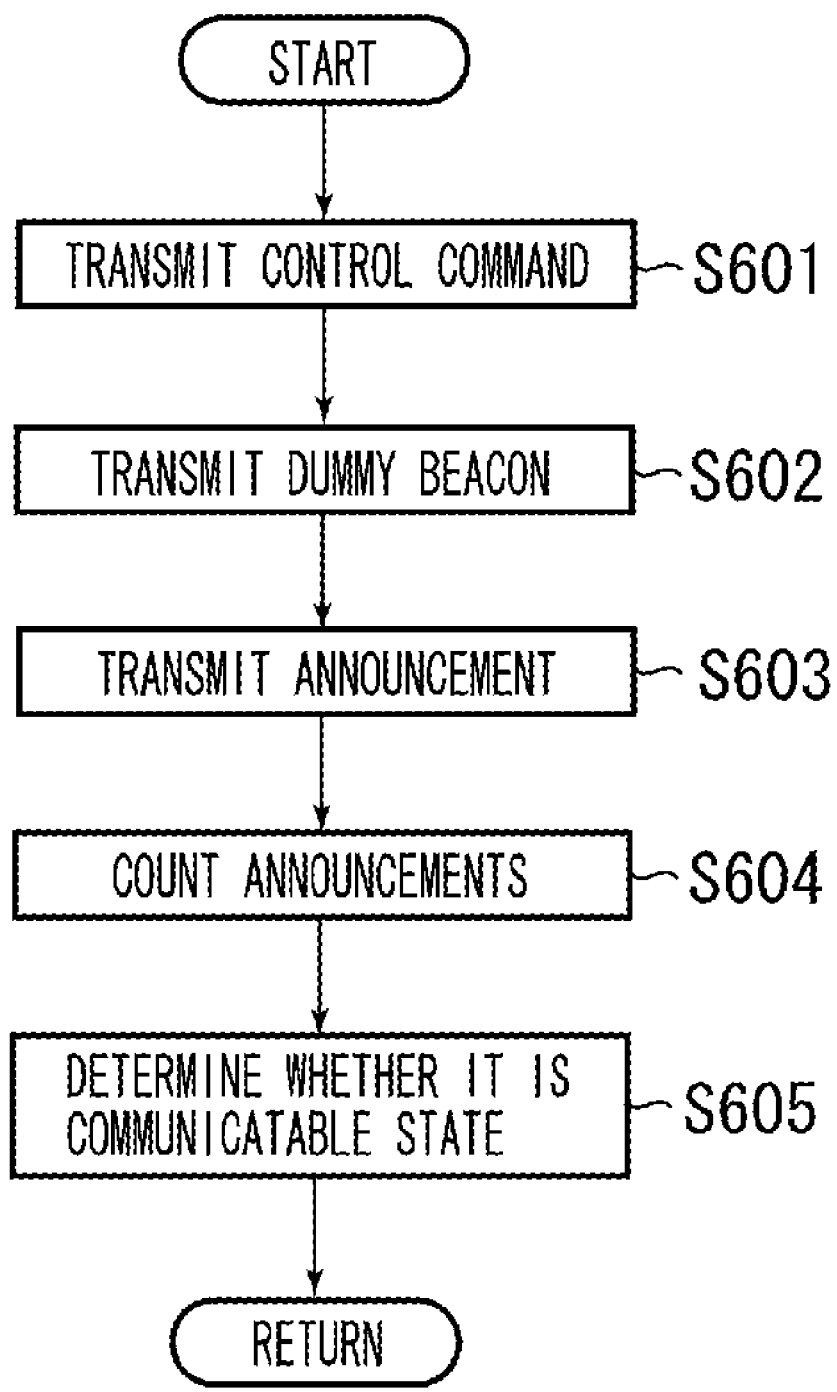
FIG. 6 is a flowchart illustrating an exemplary operation of a PNC during PNC handover according to a first exemplary embodiment of the present invention.

FIG. 6 is a flowchart illustrating an exemplary operation, according to the first exemplary embodiment, performed to determine the communicatable state, in which the PNC candidate is communicatable with each of other DEVs, by the PNC.

In step S601, the PNC transmits a control command to a PNC candidate. The control command is configured to cause the PNC candidate to transmit a pseudo information signal (i.e., a dummy beacon signal). The dummy beacon signal is a beacon signal representing information that has the same PNID as the PNID of a beacon signal transmitted from the PNC and that also has a PNC address which is an identification address of the PNC candidate. For example, the PNC 101 transmits the control command to the DEV 113.

Next, in step S602, the DEV having received the control command transmits the dummy beacon signal. For example, the DEV 113 transmits the dummy beacon signal. As described above, a PNC address included in information represented by this dummy beacon signal is an identification address of the DEV 113. Because the DEV 113 joins the piconet controlled by the PNC 101, the information represented by the dummy beacon signal has the same PNID. Therefore, the PNID included in the information represented by this dummy beacon signal is the same as that of a beacon signal transmitted by the PNC 101.

In step S603, a DEV having received the dummy beacon signal transmits an announcement signal to the PNC. That is, a DEV having received the dummy beacon signal recognizes the dummy beacon signal as a beacon signal transmitted from an adjacent piconet having the same PNID. Thus, as described above in "Detection of Adjacent Piconet", the DEV having received the dummy beacon signal transmits the announcement signal to the PNC.

For example, the DEVs 111 and 114 can receive the dummy beacon signal transmitted from the DEV 113. Thus, the DEVs 111 and 114 transmit the announcement signal to the PNC 101. Conversely, the DEV 112 cannot receive the dummy beacon signal transmitted from the DEV 113. Thus, the DEV 112 transmits no announcement signal.

In step S604, the PNC receives announcement signals from the DEVs and counts the number of the received announcement signals corresponding to each of the DEVs. Because the PNC can communicate with each of the DEVs without failure, the PNC can receive announcement signals from the DEVs at all times. For example, the PNC 101 receives announcement signals transmitted from the DEVs 111 and 114 and counts the number of the announcement signals corresponding to each of the DEVs 111 and 114.

In step S605, the PNC determines a communicatable state in which the PNC candidate having transmitted the dummy beacon signal can communicate with the other DEVs, based on information on the number of the announcement signals corresponding to each of the DEVs, which is calculated in step S604. Additionally, the PNC can determine a DEV which cannot communicate with one of the other DEVs by utilizing the DEV list 310. For example, the PNC 101 determines that the DEV 113 can communicate with the DEVs 111 and 114 and the PNC 101. Alternatively, the PNC determines that the DEV 113 cannot communicate with the DEV 112. The DEV list 310 is a list of data including identification addresses which is stored in the PNC when the DEVs join a piconet. The detail of the DEV list 310 will be described later.

Thus, the PNC can determine the communicatable state in which each of the PNC candidates can communicate with the other DEVs. The PNC determines a PNC candidate which can communicate with the largest number of DEVs from among a plurality of PNC candidates as a device to which to transfer control rights. Consequently, the number of network devices which cannot continue to join a piconet can be reduced. Alternatively, the PNC can determine a PNC candidate with which the smallest number of DEVs cannot communicate with from among a plurality of PNC candidates as a device to which to transfer control rights.

Communication Sequence During PNC Handover

Figure 7:
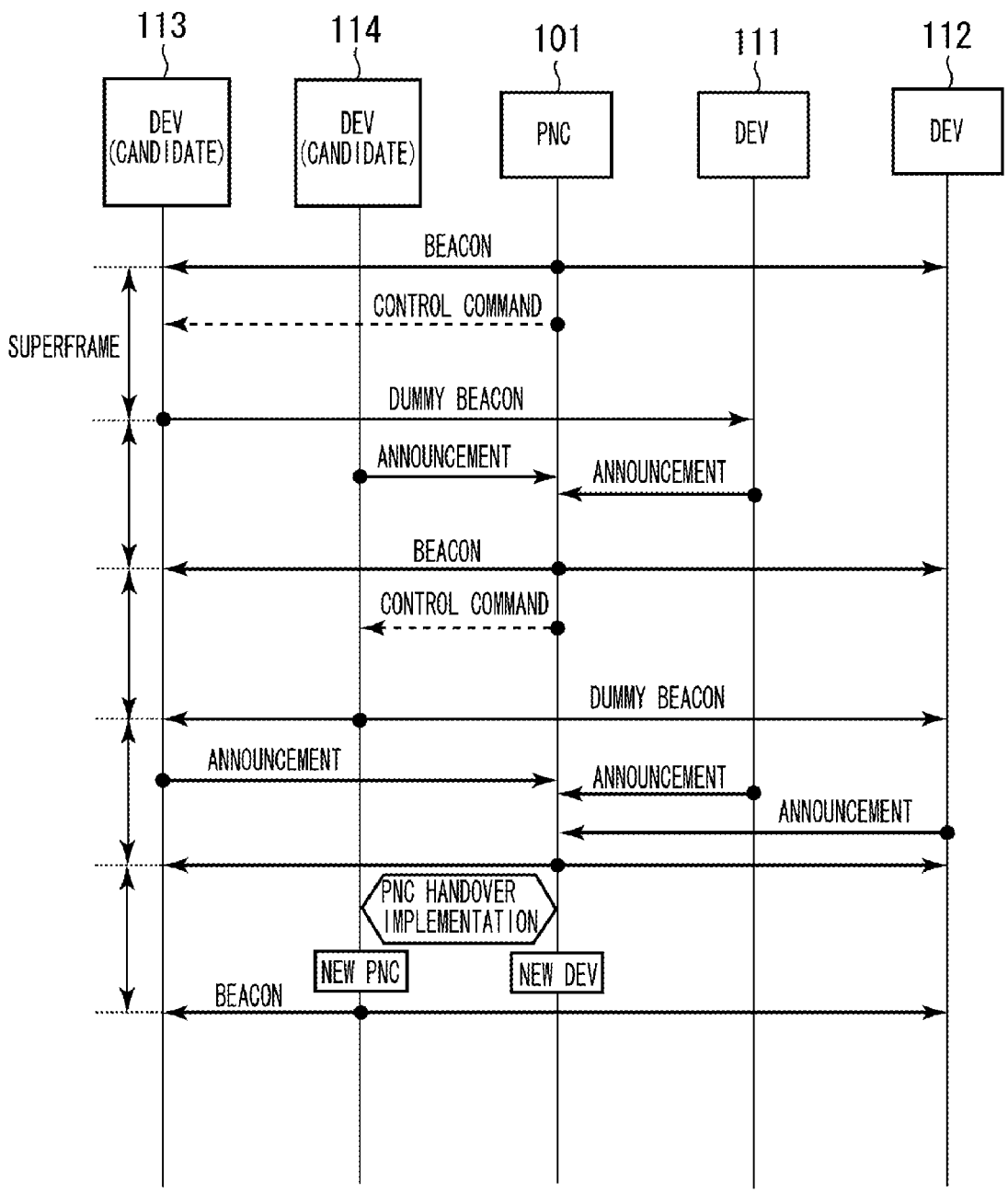
FIG. 7 illustrates an example of a communication sequence performed between devices during PNC handover according to the first exemplary embodiment.

FIG. 7 illustrates an example of a communication sequence performed between the devices during PNC handover according to the first exemplary embodiment. The following communication sequence commences by being triggered in a case where the PNC 101 needs to change an operation mode so that the PNC is changed to a DEV, or in a case where the PNC finishes an operation and leaves the network. That is, the following communication sequence is started by determining that the PNC handover is performed.

As described above, the RAM 304 stores a list of identification addresses of the DEVs in the piconet managed by the PNC 101 and a list of the functions and performance of each of the DEVs (i.e., the DEV list 310). For example, information on the functions includes information representing whether each DEV can operate as a PNC. Information on the performance includes information representing the number of DEVs that each DEV can accommodate in a piconet. The DEV list 310 is created by the PNC 101 based on information reported from each DEV when the DEV joins the piconet. Then, the DEV list 310 is stored on the RAM 304. The IEEE802.15.3 standard describes the DEV list 310 in detail, and thus, a detailed description of the DEV list 310 is omitted herein.

The PNC 101 periodically transmits beacon signals to the DEVs 111 to 114 in the piconet. The PNC 101 determines, based on the above-described DEV list 310, that the DEVs 113 and 114 are PNC candidates. Then, the PNC 101 transmits a control command to the DEV 113 (step S601) so as to cause the DEV 113 to transmit a dummy beacon signal. Here, the PNC 101 suppresses the transmission of a beacon signal in a superframe time subsequent to a superframe time in which the control command is transmitted. As long as a slot is adapted so that the DEV 113 can receive the slot, the PNC 101 may transmit a control command in an optional slot.

The DEV 113 then transmits a dummy beacon signal to the devices in the piconet (step S602). Here, the DEV 113 transmits the dummy beacon signal in a beacon time of a superframe time subsequent to the superframe time in which the DEV 113 receives the control command. As described above, the PNC 101 suppresses the transmission of a beacon signal in a superframe time subsequent to the superframe time in which the DEV 113 receives the control command. Thus, no collision of signals occurs.

The DEVs 111 and 114 having received the dummy beacon signals transmit announcement signals to the PNC 101 (step S603) However, the DEV 112 cannot receive the dummy beacon signal. Accordingly, the DEV 112 transmits no announcement signals. Also, because each DEV transmits an announcement signal in the CTA period 430, collision of each announcement signal with another signal does not occur. Then, the PNC 101 receives the announcement signals from the DEVs and counts the number of announcement signals received from the DEVs.

FIG. 7 illustrates an example in which the announcement signals are transmitted in the superframe in which the dummy beacon signal is transmitted. However, the transmission of announcement signals and the calculation of the number of received announcement signals can be performed utilizing a plurality of superframe periods.

The PNC 101 can determine according to a result of counting the number of announcement signals that in a case where control rights is transferred to the DEV 113, the DEV 112 cannot continue to join the piconet.

Subsequently, the PNC 101 checks the communicatable state of the DEV 114 in a similar procedure. That is, the PNC 101 transmits a control command to the DEV 114 (step S601) so as to cause the DEV 114 to transmit a dummy beacon signal. Then, the DEV 114 transmits a dummy beacon signal to the devices in the piconet (step S602). Then, the DEVs 111, 112, and 113 transmit announcement signals to the PNC 101 (step S603).

The PNC 101 can determine, according to a result of counting the number of announcement signals, that in a case where control rights is transferred to the DEV 114, all of the DEVs can continue to join the piconet.

Thus, the PNC 101 checks the communicatable state of each of the DEVs 113 and 114 as described above. Subsequently, the PNC 101 selects the DEV 114 which can communicate with the largest number of DEVs to be a device to which to transfer control rights. Then, PNC handover is performed on the selected DEV 114. Upon completion of performing the PNC handover, the DEV 114 starts to function as a new PNC 801 and periodically transmits a beacon signal. Meanwhile, the PNC 101 continues to join the piconet as a DEV 815. Alternatively, the PNC 101 leaves the piconet. Since the PNC handover conforms to the IEEE802.15.3 standard, a detailed description of the handover is omitted herein.

With the above procedure, the PNC determines a DEV to which to transfer control rights. Consequently, the number of devices which leave the piconet due to the PNC handover can be reduced to a minimum.

Figure 8:
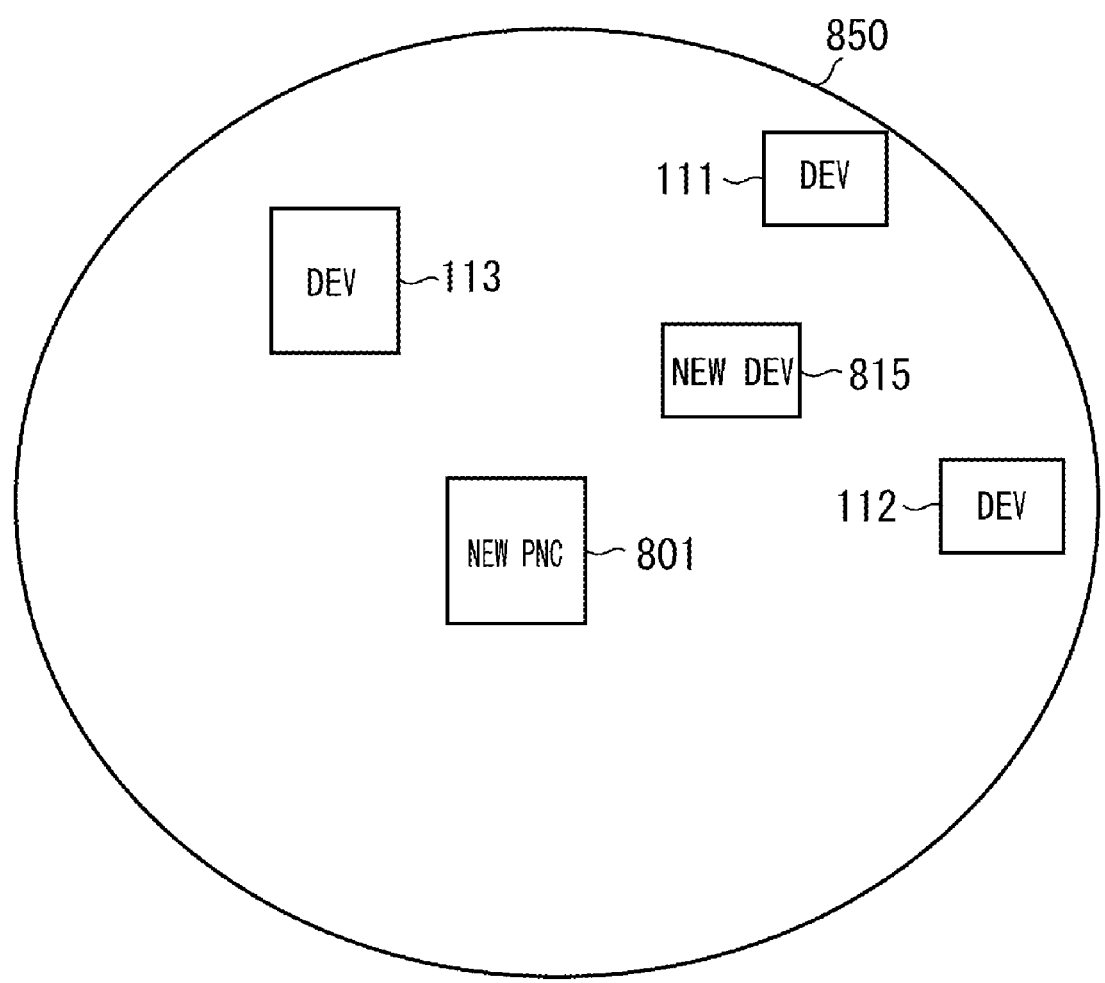
FIG. 8 illustrates an exemplary positional relationship among a control device and slave terminals according to the first exemplary embodiment after control rights are transferred.

FIG. 8 illustrates an exemplary positional relationship among the PNC and the DEVs according to the first exemplary embodiment after the PNC handover. As can be seen from FIG. 8, all of the devices that joined the piconet before the PNC handover is performed can continue to join the piconet.

As described above, the communicatable state in which each of the PNC candidates can communicate with the other DEVs is checked. Then, a DEV to which to transfer control rights is determined based on a result of checking. Consequently, the number of devices which leave the piconet due to the PNC handover can be reduced to a minimum. Also, the utilization of the function of the announcement signals enables efficient and quick processing. Additionally, the utilization of the function of the announcement signals allows for mounting the devices while suppressing a scale of change to a device conforming to the IEEE802.15.3 standard.

Second Exemplary Embodiment

Outline

According to a second exemplary embodiment, a PNC causes a PNC candidate to perform broadcast transmission of a dummy beacon signal. The second exemplary embodiment differs from the first exemplary embodiment in that the CTA period 430 is utilized as a time at which the broadcast transmission is performed. The configuration of the entire communication system and the internal configuration of each device are similar to those of the first exemplary embodiment. Therefore, a description of the configuration of the entire communication system and the internal configuration of each device is omitted herein.

Communication Sequence During PNC Handover

Figure 9:
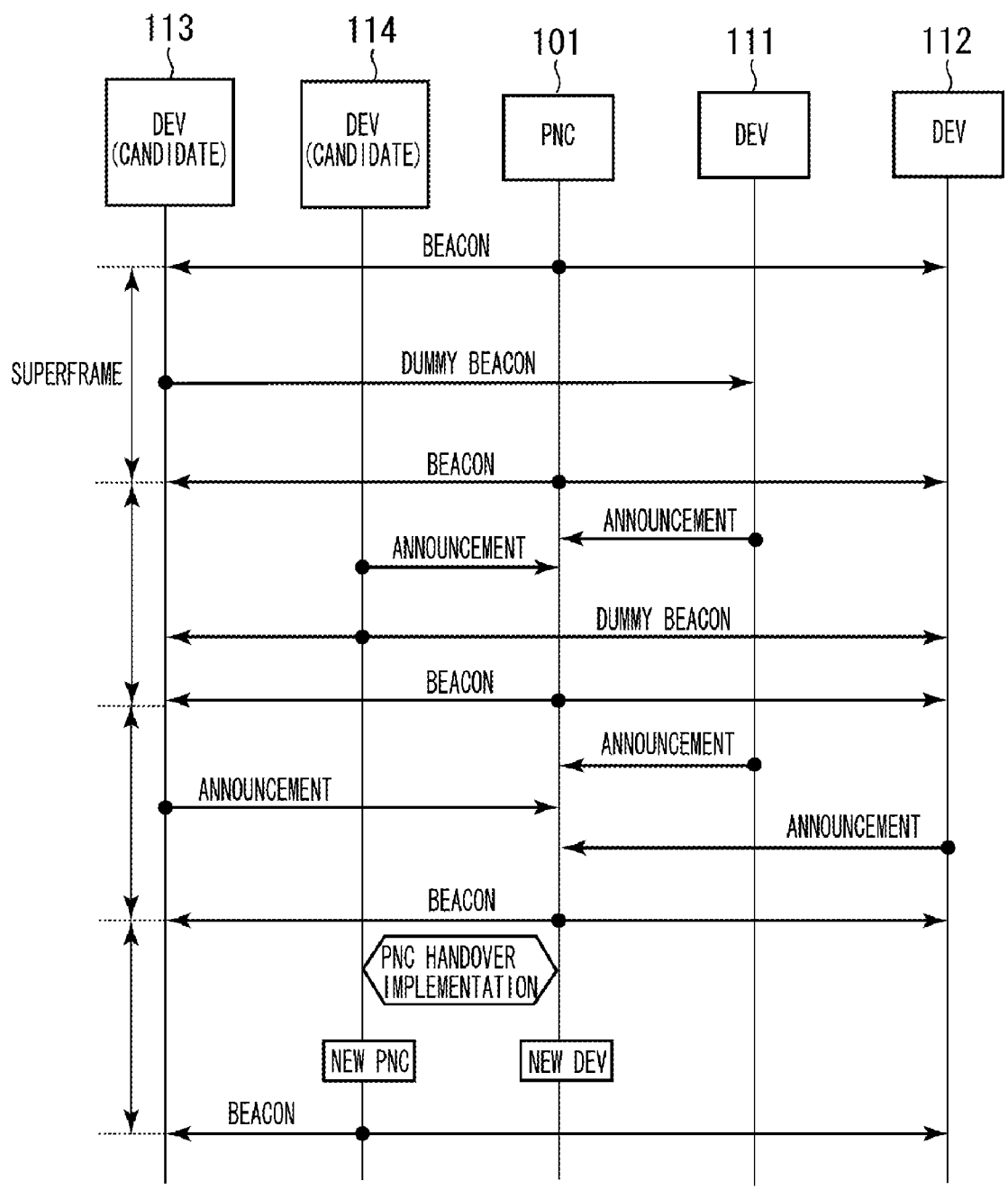
FIG. 9 illustrates an example of a communication sequence performed between devices during PNC handover according to a second exemplary embodiment.

FIG. 9 illustrates an example of a communication sequence performed between the devices during PNC handover according to the second exemplary embodiment. The following communication sequence commences by being triggered in a case where the PNC 101 needs to change an operation mode so that the PNC is changed to a DEV, or in a case where the PNC finishes an operation and leaves the network. That is, the following communication sequence is started by determining that the PNC handover is performed.

As described above, the RAM 304 stores a list of identification addresses of the DEVs in the piconet managed by the PNC 101 and a list of the functions and performance of each of the DEVs (i.e., the DEV list 310). For example, information on the functions includes information representing whether each DEV can operate as a PNC. Information on the performance includes information representing the number of DEVs that each DEV can accommodate in the piconet. The DEV list 310 is created by the PNC 101 based on information reported from a DEV when the DEV joins the piconet, and then the DEV list 310 is stored in the RAM 304.

The PNC 101 periodically transmits beacon signals to the DEVs 111 to 114 in the piconet. The PNC 101 determines, according to the above DEV list 310, that the DEVs 113 and 114 are PNC candidates. Then, the PNC 101 transmits a beacon signal, to which a slot for performing broadcast transmission is assigned, to the DEV 113. Typically, slots are assigned by the PNC according to a request from the DEV. Also, identification addresses representing a transmitting device and information representing a receiving device are typically designated as information representing each slot. In a case where an identification address representing a broadcasting (simultaneous-reception-by-all-devices) address is designated as an identification address of a receiving device, all of the devices other than the transmitting device in the piconet operate as being in a receivable state.

The DEV 113 performs broadcast transmission of a dummy beacon signal to the devices in the piconet. The DEV 113 performs the broadcast transmission of a dummy beacon signal according to a criterion that although the DEV 113 does not request, a slot for broadcast is allotted by the PNC 101. In the present exemplary embodiment, the transmission is performed by the DEV 113 in a superframe time in which the beacon signal is received. As described above, in this superframe time, the other DEVs and the PNC 101 are in a reception condition. Thus, collision of signals does not occur. The broadcast frame is similar in frame structure to the beacon frame and differs therefrom in that an identification address of the DEV 113 is stored as a PNC address.

The DEVs 111 and 114 having received the dummy beacon signals transmit announcement signals to the PNC 101. However, the DEV 112 cannot receive the dummy beacon signal. Thus, the DEV 112 transmits no announcement signals. Also, because the DEV transmits an announcement signal in the CTA period 430, collision of each announcement signal with another signal does not occur. Then, the PNC 101 receives the announcement signals from the DEVs and counts the number of announcement signals received from the DEVs.

FIG. 9 illustrates an example in which the announcement signals are transmitted in a superframe subsequent to a superframe in which the dummy beacon signal is transmitted. However, the transmission of announcement signals and the calculation of the number of received announcement signals can be performed utilizing a plurality of superframe periods.

The PNC 101 can determine, according to a result of counting the number of announcement signals, that in a case where control rights are transferred to the DEV 113, the DEV 112 cannot continue to join the piconet.

Subsequently, the PNC terminal 101 checks the communicatable state of the DEV 114 in a similar procedure. That is, the PNC 101 transmits a beacon signal to which a slot for broadcast transmission of a dummy beacon signal is allotted. Then, the DEV 114 performs broadcast transmission of a dummy beacon signal to the devices in the piconet. Next, the DEVs 111, 112, and 113 having received the dummy beacon signals transmit announcement signals to the PNC 101.

The PNC 101 can determine, according to a result of counting the number of announcement signals that in a case where control rights are transferred to the DEV 114, that all of the DEVs can continue to join the piconet.

Thus, the PNC 101 checks the communicatable state of each of the DEVs 113 and 114 as described above. Subsequently, the PNC 101 selects the DEV 114 which can communicate with the largest number of DEVs to be a device to which to transfer control rights. Then, PNC handover is performed on the selected DEV 114. As previously indicated, the procedure for the PNC handover conforms to the IEEE802.15.3 standard. Upon completion of performing the PNC handover, the DEV 114 starts to function as a new PNC and periodically transmits a beacon signal. Meanwhile, the PNC 101 continues to join the piconet as a DEV. Alternatively, the PNC 101 leaves the piconet.

With the above procedure, the PNC determines a DEV to which to transfer control. Consequently, the number of the devices which leave the piconet due to the PNC handover can be reduced to a minimum.

As described above, the communicatable state in which each of the PNC candidates can communicate with the other DEVs is checked. Then, a DEV to which to transfer control rights is determined according to a result of checking. Consequently, the number of devices which leave the piconet due to the PNC handover can be reduced to a minimum. Also, the communicatable state in which each of the PNC candidates can communicate with the other DEVs can quickly be checked. Additionally, the transmission of a dummy beacon signal can be performed by utilizing the CTA period 430 assigned to each of the DEVs. Thus, collision of dummy beacon signals can be prevented. Also, the assignment of a broadcasting slot enables a DEV to recognize the transmission of the dummy beacon signal.

Third Exemplary Embodiment
Outline

A third exemplary embodiment is directed to a method of efficiently determining a device to which to transfer control rights in a case where three or more PNC candidates are present. More specifically, priorities are preliminarily set at the PNC candidates, then, the PNC candidate first specified as a device which can assure a communication path therefrom to each of the devices in an existing piconet is determined to be a device to which to transfer control rights. Consequently, even in a case where a large number of PNC candidates are present, PNC handover can quickly be performed on an appropriate device. The internal configuration of each device is similar to that of the device in the first exemplary embodiment. Therefore, a description of the internal configuration of each device is omitted herein.

Configuration of Entire Communication System

The communication system of the present exemplary embodiment is described below, where the communication system conforms to the IEEE802.15.3 standard.

Figure 10:
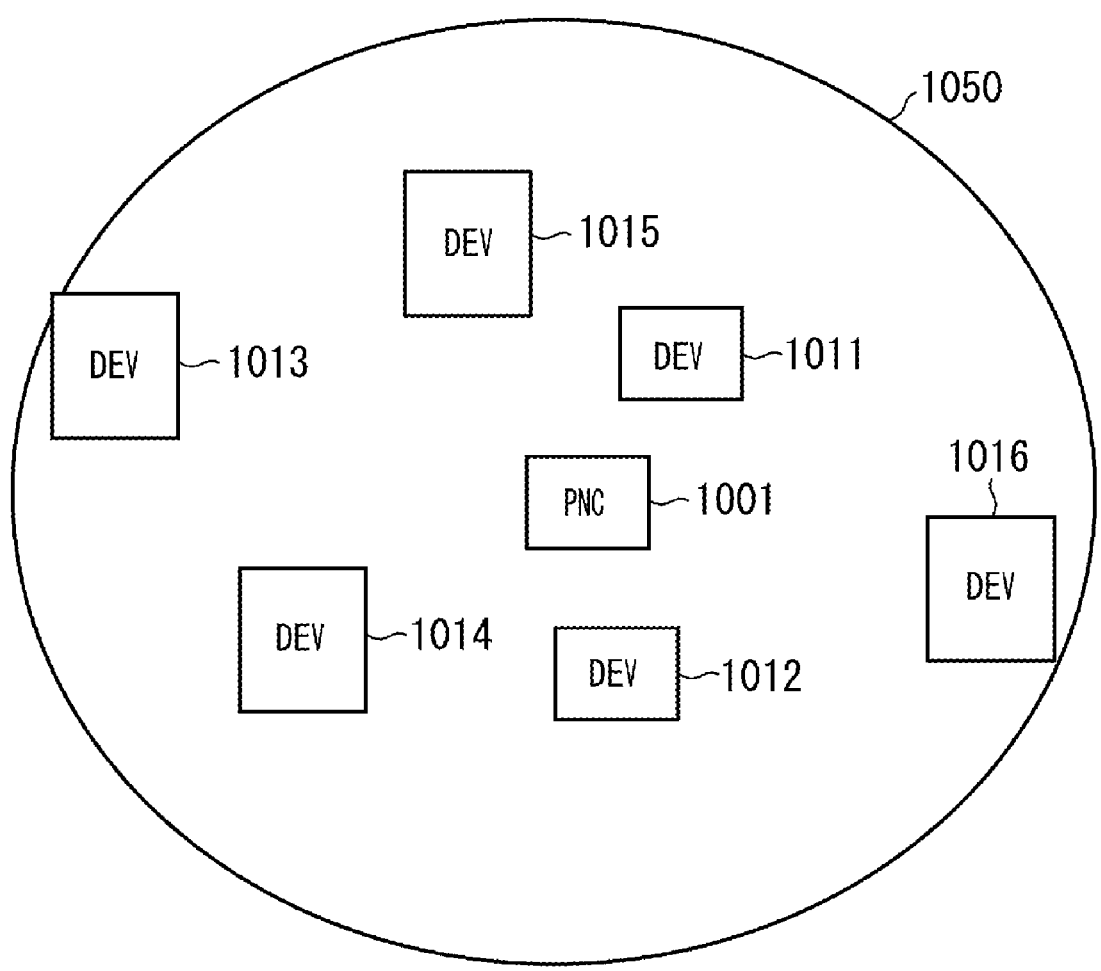
FIG. 10 illustrates an exemplary positional relationship among a control device and slave devices in a piconet according to a third exemplary embodiment of the present invention.

FIG. 10 illustrates an exemplary positional relationship among the PNC and the DEVs in the piconet according to the third exemplary embodiment. That is, the PNC 1001 manages the DEVs 1011 to 1016 as devices joining the piconet. The DEVs 1013 and 1016 cannot communicate directly with each other because of signal attenuation due to the distance between them. The DEVs 1013 to 1016 are PNC candidates.

Communication Sequence during PNC Handover

Figure 11:
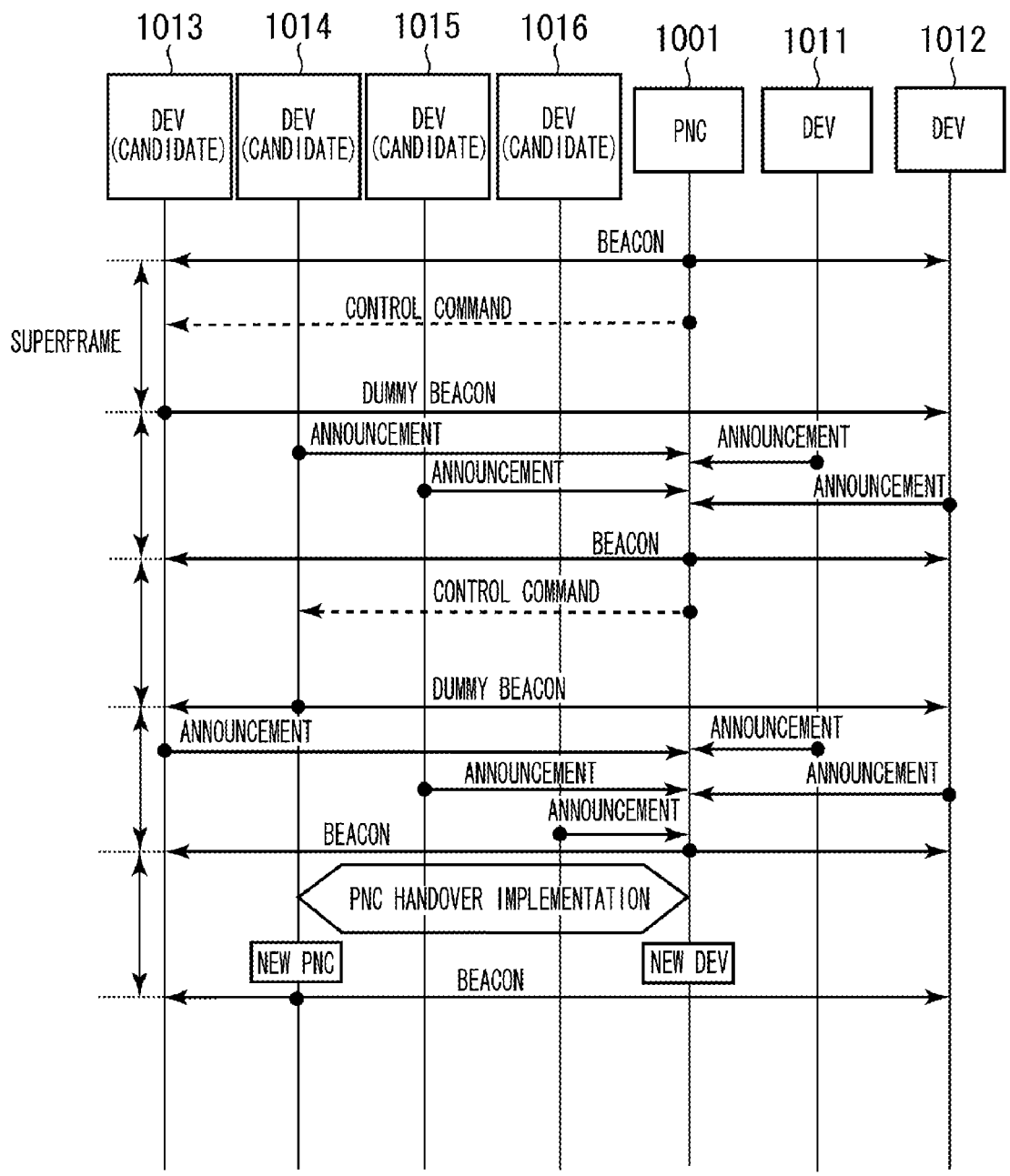
FIG. 11 illustrates an exemplary communication sequence performed between devices during PNC handover according to the third exemplary embodiment.

FIG. 11 illustrates an exemplary communication sequence performed between the devices during PNC handover according to the third exemplary embodiment. The following communication sequence commences by being triggered in a case where the PNC 1001 needs to change an operation mode so that the PNC 1001 is changed to a DEV, or in a case where the PNC 1001 finishes an operation and leaves the network. That is, the following communication sequence is started by determining that the PNC handover is performed.

The PNC 1001 has a list of identification addresses of the DEVs in the piconet managed by the PNC 1001 and a list of the functions and performance of each of the DEVs (the DEV list 310). For example, information on the functions includes information representing whether each DEV can operate as a PNC. Information on the performance includes information representing the number of DEVs that each DEV can accommodate in the piconet. The DEV list 310 is created by the PNC 1001 according to information reported from a DEV when the DEV joins the piconet. Then, the DEV list 310 is stored in the RAM 304. The IEEE802.15.3 standard describes the DEV list 310 in detail, thus a detailed description of the DEV list 310 is omitted herein.

The PNC 1001 periodically transmits beacon signals to the DEVs 1011 to 1016 in the piconet. The PNC 1001 determines, according to the DEV list 310, that the DEVs 1013 to 1016 are PNC candidates. Subsequently, prioritization is performed on the DEVs 1013 to 1016 to determine an order according to which an operation of checking a communicatable state is performed on the DEVs 1013 to 1016. The prioritization is performed according to the information on the function and performance, which includes the information representing the number of DEVs that each DEV can accommodate in the piconet. Here, the DEVs are arranged in descending order of priority, that is, the DEV 1013, the DEV 1014, the DEV 1015, and the DEV 1016.

First, the PNC 1001 transmits a control command to the DEV 1013 (step S601) so as to cause the DEV 1013 to transmit a dummy beacon signal. The PNC 1001 suppresses the transmission of a beacon signal in a superframe time subsequent to a superframe time in which the control command is transmitted. As long as a slot is adapted so that the DEV 1013 can receive the slot, the PNC 1001 can transmit a control command in an optional slot.

The DEV 1013 transmits a dummy beacon signal to the devices in the piconet (step S602). The DEV 1013 transmits the dummy beacon signal in a beacon time of a superframe time subsequent to the superframe time in which the DEV 1013 receives the control command. As described above, the PNC 1001 suppresses the transmission of a beacon signal in the superframe time subsequent to the superframe time in which the DEV 1013 receives the control command. Thus, no collision of signals occurs.

The DEVs 1011, 1012, 1014, and 1015 having received the dummy beacon signals transmit announcement signals to the PNC 1001 (step S603). However, the DEV 1016 cannot receive the dummy beacon signal. Thus, the DEV 1016 transmits no announcement signals. Also, because each DEV transmits an announcement signal in the CTA period 430, collision of each announcement signal with another signal does not occur. Then, the PNC 1001 receives the announcement signals from the DEVs and counts the number of announcement signals received from the DEVs.

FIG. 11 illustrates an example in which the announcement signals are transmitted in the superframe in which the dummy beacon signal is transmitted. However, the transmission of announcement signals and the calculation of the number of received announcement signals can be performed utilizing a plurality of superframe periods.

The PNC 1001 can determine, according to a result of counting the number of announcement signals, that in a case where control rights are transferred to the DEV 1013, the DEV 1016 cannot continue to join the piconet.

Subsequently, the PNC terminal 1001 checks the communicatable state of the DEV 1014 in a similar procedure. That is, the PNC 1001 transmits a control command to the DEV 1014 (step S601) so as to cause the DEV 1014 to transmit a dummy beacon signal. Subsequently, the DEV 1014 transmits a dummy beacon signal to the devices in the piconet (step S602). Then, the DEVs 1011, 1012, 1013, 1015, and 1016 transmit announcement signals to the PNC 1001 (step S603).

The PNC 1001 can determine, according to a result of counting the number of announcement signals, that in a case where control rights are transferred to the DEV 1014, all of the DEVs can continue to join the piconet. Thus, the PNC 1001 selects the DEV 1014 as a device to which to transfer control rights. This is because the checking of the communicatable states of the DEVs 1015 and 1016 serving as the remaining PNC candidates does not affect the selection of a device to which to transfer control.

In a case where PNC candidates communicatable with all of the DEVs are not present, the checking of the communicatable state is performed on all of the PNC candidates. Then, a DEV, e.g., the DEV 1014, having the largest number of DEVs communicatable with the DEV 1014 as compared with the other DEVs is determined as a device to which to transfer control rights.

The procedure for the PNC handover conforms to the IEEE802.15.3 standard, and thus a detailed description thereof is omitted herein. Upon completion of the PNC handover, the DEV 1014 starts to function as a new PNC and periodically transmits a beacon signal. Meanwhile, the PNC 1001 continues to join the piconet as a DEV. Alternatively, the PNC 1001 leaves the piconet.

With the above procedure, the PNC determines a DEV to which to transfer control rights. Consequently, the number of devices which leave the piconet due to the PNC handover can be reduced to a minimum. Additionally, in a case where a large number of PNC candidates are present, the time required to perform a selection operation can be reduced considerably.

In the foregoing description of the present exemplary embodiment, the prioritization to determine the order according to which an operation of checking a communicatable state is performed, is performed according to the information on the function and performance, which includes the information representing the number of DEVs that each DEV can accommodate in the piconet. Performance of the prioritization is not limited to this type of information, and the prioritization can be performed according to any kind of information that would enable the DEVs to continue to join the piconet.

For example, the prioritization can be performed according to reception level information representing a reception level of a radio wave received from each DEV. Generally, the higher the reception level is of a radio wave received by the PNC 1001 from a DEV, the closer the DEV is physically to the PNC 1001. Thus, the DEV transmitting a radio wave with a high reception level at the PNC 1001 can be expected to have a communicatable range close to the communicatable range of the PNC 1001.

Other Exemplary Embodiments

The above described exemplary embodiments can be implemented by causing a system or an apparatus to read and execute program code directly or remotely supplied thereto. Accordingly, the program code itself installed in the computer to implement the functions and processes of the present invention on computers is included in the scope of the present invention.

In such a case, as long as programs have the functions, the programs having any form can be employed. For example, object code, program code executed by an interpreter, and script data supplied to an operating system (OS) can be employed.

Recording media for supplying the program include, for example, a flexible disk, a hard disk, an optical disk, a magneto-optical disk (MO), a compact disk read only memory (CD-ROM), a magnetic tape, a nonvolatile memory card, a read-only memory (ROM), and a digital versatile disk read only memory (DVD-ROM).

The program read from the recording media can be written on a memory on an expansion board inserted into the computer or on an expansion unit connected thereto. According to instructions issued from the program, a CPU or the like provided on the expansion board or the expansion unit performs part or all of actual processes to implement the above functions of the exemplary embodiments.

Thus, the present invention can provide techniques enabled to reduce, when a control rights transfer process is performed in a network, the number of network devices that cannot continue to join the network.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-317113 filed Oct. 31, 2005, which is hereby incorporated by reference herein in its entirety.

What is claimed is:

1. A communication apparatus comprising:
a storage unit configured to store information indicating a plurality of other communication apparatuses participating in a network managed by the communication apparatus;
an instruction unit configured to instruct a first communication apparatus to transmit a first signal, wherein the first signal is a signal for causing an apparatus that has received the first signal to transmit a second signal to the communication apparatus;

a receiving unit configured to receive the second signal from at least one apparatus that receives the first signal from the first communication apparatus;

a determination unit configured to determine, based on the information stored in the storage unit and a result of reception by the receiving unit, whether the receiving unit has received the second signal from the plurality of other communication apparatuses; and a request unit configured to request the first communication apparatus to manage the network according to a result of determination by the determination unit.

2. The communication apparatus according to claim 1, wherein the storage unit further stores specification information for specifying the first communication apparatus, and wherein the instruction unit instructs the first communication apparatus to transmit the first signal based on the specification information stored in the storage unit.

3. The communication apparatus according to claim 1, wherein the request unit requests the first communication apparatus to manage the network prior to termination of control of the network by the communication apparatus.

4. The communication apparatus according to claim 1, wherein the first signal comprises network identification information for identifying the network and apparatus information of an apparatus having transmitted the first signal, and wherein another communication apparatus that has received the first signal transmits the second signal in a case where the first signal received by the another communication apparatus comprises the network identification information of a network in which the another communication apparatus participates and apparatus information which indicates an apparatus different from the communication apparatus.

5. The communication apparatus according to claim 1, wherein the instruction unit instructs the first communication apparatus to transmit the first signal during a period when the communication apparatus is to transmit an annunciation signal for network synchronization.

6. The communication apparatus according to claim 1, wherein the first signal comprises same network information as an information signal for network synchronization transmitted from the communication apparatus.

7. A communication method for a communication apparatus, the method comprising steps of:

storing information indicating a plurality of other communication apparatuses participating in a network managed by the communication apparatus;

instructing a first communication apparatus to transmit a first signal, wherein the first signal is a signal for causing an apparatus that has received the first signal to transmit a second signal to the communication apparatus;

receiving the second signal from at least one apparatus that receives the first signal from the first communication apparatus;

determining, based on the stored information and a result of reception, whether the second signal has been received from the plurality of other communication apparatuses; and requesting the first communication apparatus to manage the network according to a result of determination.

8. The communication method according to claim 7, further comprising steps of:

storing specification information for specifying the first communication apparatus; and instructing the first communication apparatus to transmit the first signal based on the stored specification information.

9. The communication method according to claim 7, further comprising requesting the first communication apparatus to manage the network prior to termination of control of the network by the communication apparatus.

10. The communication method according to claim 7, wherein the first signal comprises network identification information for identifying the network and apparatus information of an apparatus having transmitted the first signal, and wherein another communication apparatus that has received the first signal transmits the second signal in a case where the first signal received by the another communication apparatus comprises the network identification information of a network in which the another communication apparatus participates and apparatus information which indicates an apparatus different from the communication apparatus.

11. The communication method according to claim 7, wherein the instructing step instructs the first communication apparatus to transmit the first signal during a period when the communication apparatus is to transmit an annunciation signal for network synchronization.

12. The communication method according to claim 7, wherein the first signal comprises same network information as an information signal for network synchronization transmitted from the communication apparatus.

13. A non-transitory computer-readable storage medium storing computer-executable process steps for controlling a communication apparatus, the computer-executable process steps comprising:

storing information indicating a plurality of other communication apparatuses participating in a network managed by the communication apparatus;

instructing a first communication apparatus to transmit a first signal, wherein the first signal is a signal for causing an apparatus that has received the first signal to transmit a second signal to the communication apparatus;

receiving the second signal from at least one apparatus that receives the first signal from the first communication apparatus;

determining, based on the stored information and a result of reception, whether the second signal has been received from the plurality of other communication apparatuses; and requesting the first communication apparatus to manage the network according to a result of determination.

14. The non-transitory computer-readable storage medium according to claim 13, the computer-executable process steps further comprising:

storing specification information for specifying the first communication apparatus; and instructing the first communication apparatus to transmit the first signal based on the stored specification information.

15. The non-transitory computer-readable storage medium according to claim 13, the computer-executable process steps further comprising requesting the first communication apparatus to manage the network prior to termination of control of the network by the communication apparatus.

16. The non-transitory computer-readable storage medium according to claim 13, wherein the first signal comprises network identification information for identifying the network and apparatus information of an apparatus having transmitted the first signal, and wherein another communication apparatus that has received the first signal transmits the second signal in a case where the first signal received by the another communication apparatus comprises the network identification information of a network in which the another communication apparatus participates and apparatus information which indicates an apparatus different from the communication apparatus.

17. The non-transitory computer-readable storage medium according to claim 13, wherein the instructing step instructs the first communication apparatus to transmit the first signal during a period when the communication apparatus is to transmit an annunciation signal for network synchronization.

18. The non-transitory computer-readable storage medium according to claim 13, wherein the first signal comprises same network information as an information signal for network synchronization transmitted from the communication apparatus.

* * * * *